United States Patent [19]

Hakoun et al.

[11] Patent Number: 5,123,068
[45] Date of Patent: Jun. 16, 1992

[54] INTEGRATED OPTICAL COMPONENT AND METHOD OF MANUFACTURE

[75] Inventors: Roland Hakoun, Domont; Eric Tanguy, Paris, both of France

[73] Assignee: Alcatel Fibres Optiques, Cedex, France

[21] Appl. No.: 688,236

[22] Filed: Apr. 22, 1991

[30] Foreign Application Priority Data

Apr. 27, 1990 [FR] France .................. 90 05408

[51] Int. Cl.⁵ .............................................. G02B 5/14
[52] U.S. Cl. ......................................... 385/14; 385/49
[58] Field of Search ........................... 350/96.10–96.14

[56] References Cited

U.S. PATENT DOCUMENTS 4,750,800 6/1988 Fournier et al. .............. 350/96.11
4,943,130 7/1990 Dannoux et al. ........... 350/96.11 X

FOREIGN PATENT DOCUMENTS 0283203 9/1988 European Pat. Off.
61-55616 3/1986 Japan.

OTHER PUBLICATIONS

Patent Abstracts of Japan, vol. 9, No. 262 (P-398) [1985], Oct. 19, 1985; & JP-A-60 111 203 (Tateishi Denki).
International Conference on Integrated Optics and Optical Fiber Communication, 11th European Conference on Optical Communication, Venezia, Oct. 1-4, 1985, pp. 187-190; P. Barlier et al.: "Passive integrated optics components for fiber optics communication in moldable glass".
Patent Abstracts of Japan, vol. 10, No. 220 (P-482) [2276], Jul. 31, 1986; and JP-A-6155616 (Shimadzu Corp) Mar. 20, 1986.

*Primary Examiner*—Akm E. Ullah
*Attorney, Agent, or Firm*—Sughrue, Mion, Zinn, Macpeak & Seas

[57] ABSTRACT

The integrated optical component having a glass substrate including integrated optical waveguides wherein the substrate further includes longitudinal grooves at opposite ends of the central portion thereof, which longitudinal grooves are obtained by machining, using the terminal portions of the waveguides extending beyond said central portion as marks for determining the line of machining, together with two transverse grooves on either side of the central portion of the substrate, with the two grooves being separated by a rib whose height is rectified so as to support each fiber to be connected to a waveguide that opens on the same side as the rib.

7 Claims, 2 Drawing Sheets

INTEGRATED OPTICAL COMPONENT AND METHOD OF MANUFACTURE

The present invention relates to an integrated optical component and to a method of manufacturing it.

BACKGROUND OF THE INVENTION

In conventional manner, the "integrated optical" technique can be used to make waveguides in a dielectric substrate, generally made of glass, by locally increasing the refractive index of the glass. This can be done by means of an ion diffusion method or by a method of depositing appropriate layers on the substrate.

Such integrated optical components are being used more and more in the fields of transmission using optical fibers. One of the problems encountered in industrial production of such optical integrated components, in particular components such as couplers, bears on the way optical fibers must be aligned with very great accuracy relative to the waveguides created in the substrate. The accuracy of this alignment is of the order of a micron, and is sometimes even less. It is difficult to achieve because of the poor mechanical strength of optical fibers.

To solve this problem, document FR-A-2 612 301 (equivalent to EP 0 283 203) describes an integrated optical component in which the glass substrate comprises a central portion in which the waveguides are formed together with two end portions at opposite ends of the central portion, which end portions include fiber-positioning grooves and grooves for leaving clearance for the fibers. The substrate is precision molded together with its fiber-positioning grooves. The waveguides are made in the central portion of the substrate with the ends of the waveguides being aligned with the fiber-positioning grooves that already exist on the substrate. The fiber-clearance grooves are disposed transversely to the positining grooves and to the waveguides, and preferably after the waveguides have been formed, by mechanical machining. They are at opposite ends of the central portion and they are adjacent to the ends of the waveguides in order to define an interface shoulder on either side of the central portion for the purpose of coupling the fibers to the waveguides.

The positioning grooves enable the stripped fibers that they receive individually to be brought approximately into alignment with the ends of the waveguides and they enable the ends of the fibers to be put substantially into contact against the corresponding interface shoulder. With the fibers positioned in this way, they are held in their positioning grooves, and they are bonded to the substrate by means of adhesive while their ends in the clearance grooves remain free.

The clearance grooves then make it possible to obtain final accurate alignment between the fibers and the waveguides prior to bonding the ends of the fibers against the corresponding interface shoulders. This final accurate alignment is achieved by means of a micro-manipulator whose grasping component is capable of grasping the free ends of the fibers in the gap provided by each clearance groove. This final adjustment serves to compensate for the lack of sufficient precision in alignment (which is difficult to obtain) between the waveguides and the positioning grooves that are molded in the substrate.

In that integrated optical component, the clearance grooves provided to leave the ends of the fibers free for the purpose of final adjustment by micro-manipulation, suffer from weakening the fibers mechanically once alignment has been obtained and their ends have been finally bonded in position. This final bonding becomes fragile: it makes it difficult to withdraw the micro-manipulator engaged on the ends of the fibers and it is highly sensitive to environmental conditions, particularly when the final adjustment performed by the micro-manipulator is relatively large.

An object of the present invention is to avoid these drawbacks.

SUMMARY OF THE INVENTION

The present invention provides an integrated optical component having a glass substrate with integrated optical waveguides in a central portion thereof, first longitudinal grooves substantially in alignment with the various individual waveguides in two end portions at opposite ends of the central portion to receive optical fibers to be connected to the waveguides, and two transverse grooves adjacent to the waveguides at respective ends of said central portion, defining on each end of the central portion an interface shoulder for connection therewith, wherein said glass substrate further includes:

two transverse grooves parallel to said first transverse grooves and adjacent to said first longitudinal grooves in respective ones of the two end portions, which longitudinal grooves open out therein; and a rib between the first and second transverse grooves at each end of the central portion, the height of the rib above the bottom of the first transverse grooves being substantially less than the height of the central portion thereabove, for the purpose of supporting the end of each optical fiber positioned against the adjacent interface shoulder.

The glass substrate may further include second longitudinal grooves each in alignment with a corresponding one of the first longitudinal grooves which it extends to the end of the substrate, and with the section of the second longitudinal grooves being greater than the section of the first longitudinal grooves.

The invention also provides a method of manufacturing said integrated optical component, the method consisting in performing the following operations successively in a glass substrate having faces that are initially plane:

in a first stage, forming said waveguides in said central portion and at least a little therebeyond at opposite ends thereof, and forming marks in alignment with the individual waveguides and positioned substantially on the two ends of the substrate on either side of the central portion, the waveguides and the marks being formed using integrated optical techniques;

in a second stage, machining first longitudinal grooves with the terminal portions of the waveguides and said marks obtained in the first stage serving as guides for the lines followed by the first longitudinal grooves, each of which is formed on an end portion of one of the waveguides, on the corresponding mark, and between said waveguide and said mark;

in a third stage, machining first and second transverse grooves, eliminating the machining interfaces between the first longitudinal grooves and the waveguides; and in a fourth stage machining the ribs to rectify them in height.

BRIEF DESCRIPTION OF THE DRAWINGS

An embodiment of the invention is described by way of example with reference to the accompanying drawings, in which.

DETAILED DESCRIPTION

Figure 1:
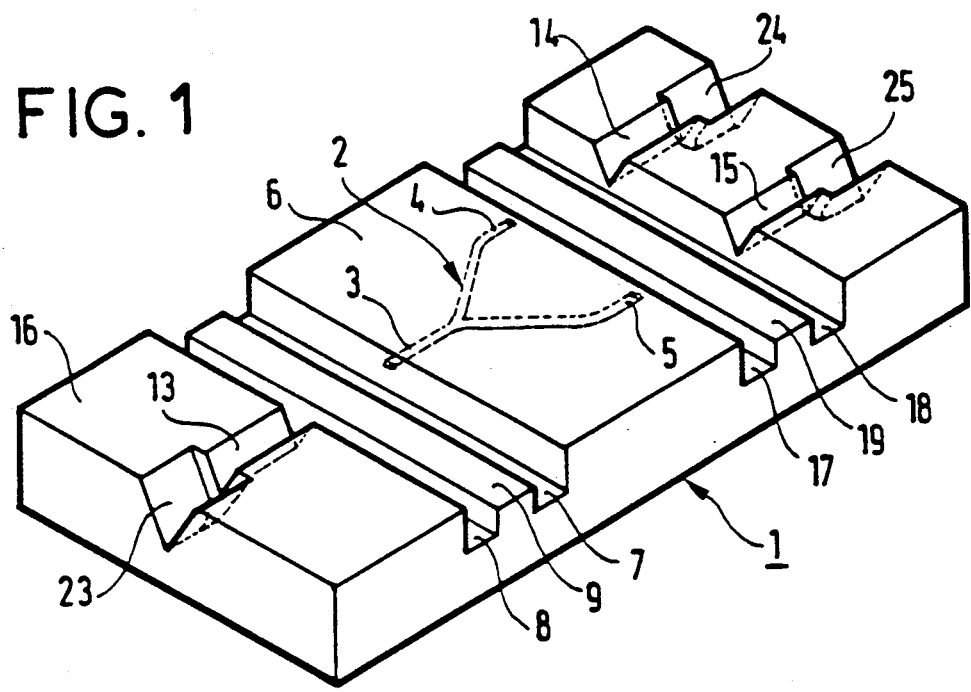
FIG. 1 is a perspective view of an integrated optical component of the present invention.

FIG. 1 shows a glass substrate 1 which is generally rectangular in shape, having various portions constituting the integrated optical component of the invention formed in one of its surfaces. The central portion of the substrate has integrated optical waveguides 2. These waveguides constitute a Y-coupler in the present example, with a common branch 3 to which two other branches 4 and 5 are connected. This central portion of the substrate is given overall reference 6.

One end of the substrate adjacent to the common branch 3 has first and second transverse grooves 7 and 8 which are parallel to each other and which extend transversely to the branch 3, with the grooves being disposed on either side of a rib 9.

These two grooves 7 and 8 are narrow and they are rectangular in section. The groove 7 closer to the branch 3 has its side furthest from the rib in which the end of the common branch 3 terminates extending vertically, thereby defining an interface shoulder for connecting a fiber to the branch 3.

The height of the rib 9 is defined to be slightly less than the height of the central portion 6 above the bottoms of the grooves 7 and 8 so as to support the fiber to be connected to the branch 3 when it looks into said branch.

Beyond the two transverse grooves 7 and 8, the substrate also has a first longitudinal groove 13 in alignment with the end of the branch 3 and opening out into the transverse groove 8, and a second longitudinal groove 23 extending the groove 13, being larger than the groove 13 and opening out into one of the small end faces of the substrate. The end portion having these two longitudinal grooves is designated by reference 16. It is at the same level as the central portion 6.

The other end portion of the substrate 1 adjacent to the branches 4 and 5 has two transverse grooves 17 and 18 on either side of a rib 19 in a configuration which is entirely analogous to the grooves 7 and 8 and the intervening rib 9. The side of the grooves 17 opposite to the rib 19 defines an interface shoulder for connecting two fibers to the branches 4 and 5 respectively. The rib 19 supports these two fibers vertically in the same manner as the rib 9.

Beyond these two transverse grooves 17 and 18, this end of the substrate has an end portion referenced 26 with two longitudinal grooves 14 and 15 that are in alignment with respective ones of the two branches 4 and 5, and opening out into the transverse groove 18 and into respective second longitudinal grooves 24 and 25. The longitudinal grooves 24 and 25 extend the grooves 14 and 15 respectively, they are larger in section, and they open out to the end of the substrate.

The grooves 13, 14 & 15 and 23, 24 and 25 are V-grooves, they are all made by machining and they could be of some other shape, as determined by the machining tool.

The transverse grooves 7, 8, 17 and 18 are U-section or rectangular in section.

The manufacturing method of the invention is described with reference to FIGS. 2 and 3 which show two preliminary stages in the processing for obtaining the integrated optical component of FIG. 1. In these FIGS. 2 and 3, the same references are used as in FIG. 1 for designating corresponding items, however at the ends of the manufacturing stages under consideration, the configurations of these items are not identical to their configurations in the final component as shown in FIG. 1.

Figure 2:
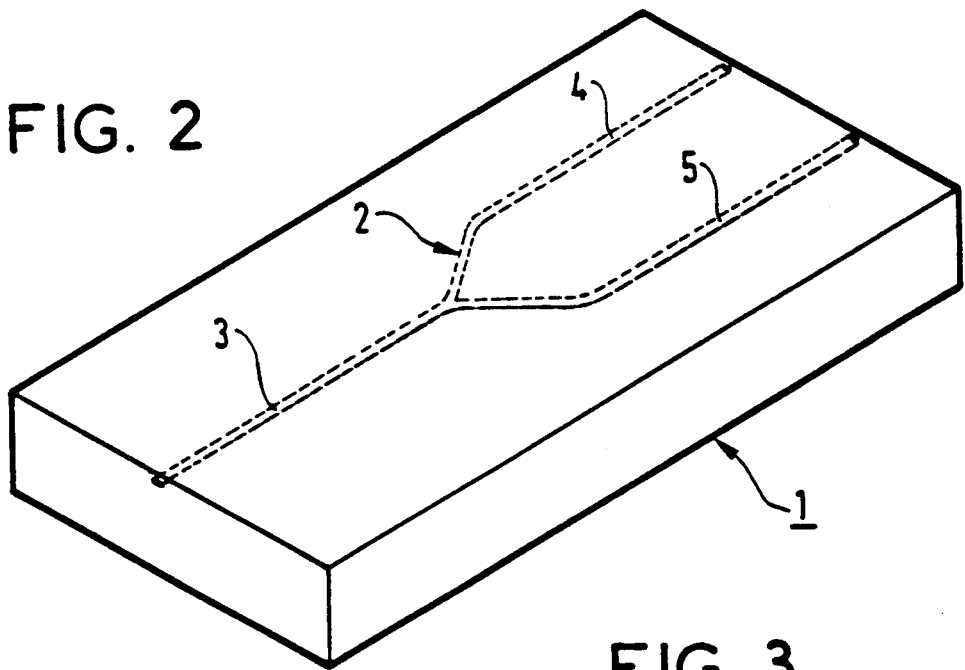
FIGS. 2 and 3 show the above component after two successive stages in the manufacturing method of the invention.

FIG. 2 shows the stage of creating the waveguide 2 on the substrate 1 using an integrated optical technique, e.g. by using a photo-etching method. The individual waveguides or branches 3, 4, and 5 of the Y-coupler in question are referenced. The top surface of the substrate is initially almost perfectly flat. The waveguides 2, 3, and 4 are formed therein to a small depth over the entire length of the top surface which is free from any grooves at the end of this stage.

Figure 3:
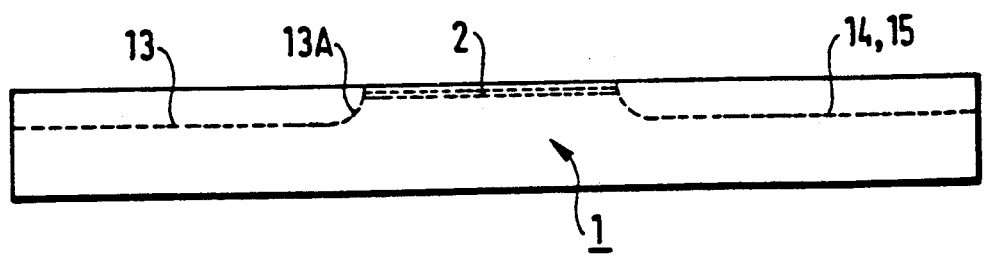

FIG. 3 shows the stage of forming the longitudinal grooves after the stage shown in FIG. 2. FIG. 3 shows the substrate 1 in section through its waveguides 2 and with the narrower longitudinal grooves machined therein, namely the groove 13 and the grooves 14 and 15. These grooves are formed over a fixed length directly over the already-made waveguides. Each of these grooves goes to the corresponding end of the substrate. For this stage, the terminal portions of the waveguides obtained at the end of the stage shown in FIG. 2 are thus used directly as markers for guiding the machining tool. These grooves eliminate the portions of the waveguides along which they run and they are accurately aligned with the remaining new terminal portions of the waveguides.

As can be seen in FIG. 3, the grooves made in this way extend towards the middle portion of the substrate a little way beyond the terminal end portions 16 or 26 of the finished component as shown in FIG. 1. At the end of this stage and because of the machining tool, each of the longitudinal grooves is terminated by a rounded interface to the corresponding waveguide 2, such as the interface 13A for the groove 13.

Above-described FIG. 1 corresponds to the final stage in component manufacture. This final stage consists in machining the following in the substrate obtained at the end of the stage shown in FIG. 3:

the transverse grooves 8 and 18 which eliminate the rounded interface ends such as 13A leading to the waveguides, with the longitudinal grooves 13 and 14 and 15 opening out directly into the transverse grooves 8 and 18;

the transverse grooves 7 and 17 which run parallel to the grooves 8 and 18 and which cause the ribs 9 and 19 to appear and also the interface shoulders for connecting the fibers to the waveguides that remain solely in the central portion 6 of the substrate;

the top face of each of the ribs 9 and 19, which ribs are thus rectified or truncated in height relative to their initial level that used to correspond to the level of the central portion 6, thereby providing vertical support for the fibers to be connected to the waveguides; and the longitudinal grooves 23, 24, and 25 which grooves are formed at the outside ends of the substrate in the ends of the narrow grooves formed at the end of the stage shown in FIG. 3, with the machining of the grooves 23, 24, and 25 leaving rounded interface ends with the narrow grooves 13, 14, and 15, which rounded interface ends are not referenced, and are not harmful.

Figure 4:
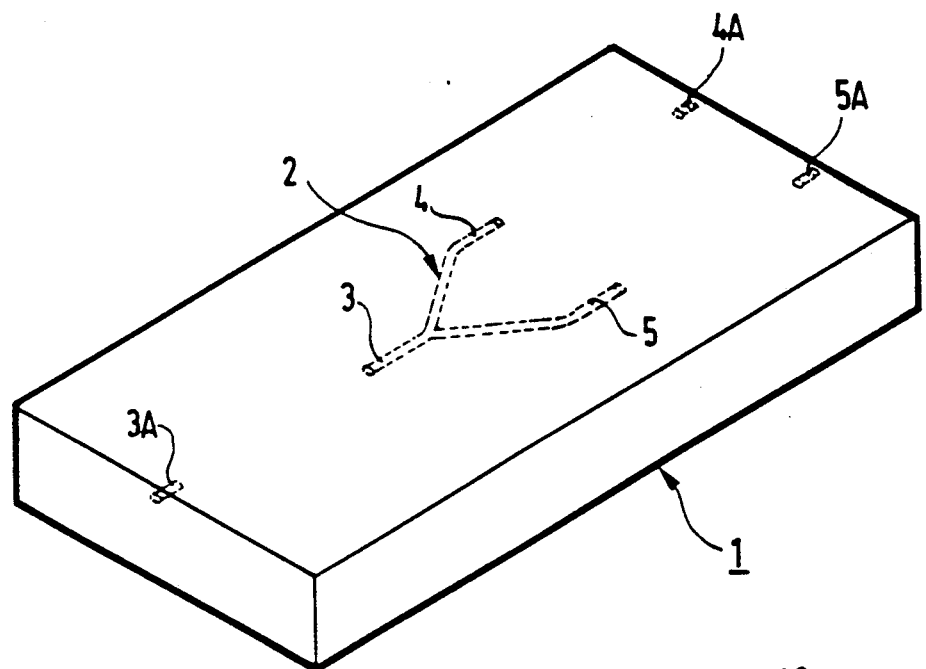
FIG. 4 shows a variant of the stage shown in FIG. 2.

In the method of manufacturing an integrated optical component, FIG. 4 corresponds to a variant of the stage shown in FIG. 2. In this variant, the waveguides 2 are formed in the central portion substrate 1, projecting a little beyond their final ends. Reference markers 3A, 4A, and 5A are formed simultaneously with the waveguides and by the same integrated optical procedure, which markers are in alignment with corresponding ones of the waveguides 3, 4, and 5 and are disposed close to the ends of the substrate. Under these conditions, it is the markers and the ends of the waveguides that are used for guiding the line followed by the grooves during the stage shown by FIG. 3.

Figure 5:
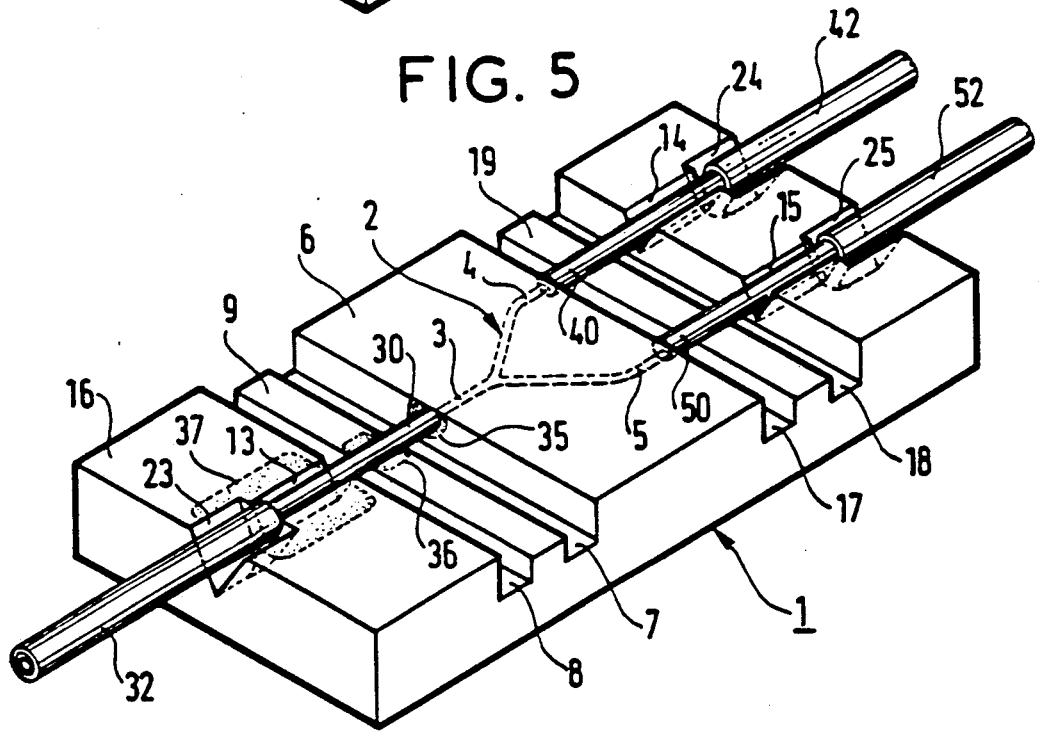
FIG. 5 shows the integrated optical component of FIG. 1 having optical fibers mounted thereon.

FIG. 5 shows the integrated optical component of FIG. 1 with an optical fiber 30 connected to waveguide 3, and in similar manner, optical fibers 40 and 50 connected to the waveguides 4 and 5, with each of the fibers being bonded to the substrate. Each of these optical fibers is covered with a resin covering 32, or 42, or 52. To connect the optical fibers to the waveguides, the end of each fiber is prepared by removing the covering as shown and described below with reference to installing the fibers in the longitudinal grooves. Thereafter, each fiber is placed on the substrate in its longitudinal grooves, and it is brought substantially into contact with the end of the corresponding waveguide, i.e. against the connection interface shoulder. At this stage, e.g. for the fiber 30, the portion thereof covered with the covering 32 lies in the wide longitudinal groove 23 while its stripped terminal portion 30 extends along the longitudinal groove 13, rests on the rib 9, and overlies the transverse groove 7 near the end of the waveguide 3.

Micro-manipulation applied to the portions of the fibers outside the substrate 1 and inside their covering serves to adjust the final positioning of the fibers into accurate alignment with the individual waveguide, and to hold the fibers in position until they have been bonded to the substrate which is thus achieved with high accuracy.

The bonding is preferably obtained by gluing, e.g. using an adhesive that sets under ultraviolet radiation. These bonding zones are shown and identified in FIG. 5 for the fiber 30 only. They are as follows:

the ends of the stripped fibers facing the waveguides, i.e. the zone 35 for the fiber 30;

the stripped fibers on the ribs, i.e. the zone 36 for the fiber 30 on the rib 9; and the fibers and the fiber coverings in the various longitudinal grooves, i.e. the zone 37 for stripped fiber 30 in longitudinal groove 13 and for its covering 32 in the groove 23.

Bonding the fibers in this way such that each covering and each stripped fiber is fixed to the glass substrate imparts good traction strength and excellent strength with respect to changes in environmental conditions.

The invention is described above with reference to the embodiment shown in the drawings. Naturally, detailed modifications could be made thereto without going beyond the scope of the invention. In particular, the fibers need not be stripped where they overlie the supporting ribs, in which case the fibers are covered where they are bonded to the ribs.

We claim:

1. An integrated optical component having a glass substrate with integrated optical waveguides in a central portion thereof, first longitudinal grooves substantially in axial alignment with the various individual waveguides in two end portions at opposite ends of the central portion to receive optical fibers to be connected to the waveguides, and two first transverse grooves adjacent to the waveguides at respective ends of said central portion, defining on each end of the central portion an interface shoulder for connection therewith, said glass substrate further including:

two second transverse grooves parallel to said first transverse grooves and adjacent to said first longitudinal grooves in respective ones of the two end portions, which longitudinal grooves open out therein; and a rib between the first and second transverse grooves at each end of the central portion, the height of the rib above the bottom of the first transverse grooves being substantially less than the height of the central portion thereabove, for the purpose of supporting the end of each optical fiber positioned against the adjacent interface shoulder at a proper vertical height and in exact axial alignment with respective ends of said integrated optical waveguides of said central portion of said substrate.

2. An integrated optical component according to claim 1, wherein the glass substrate further includes second longitudinal grooves each in alignment with the corresponding one of the first longitudinal grooves which it extends to the end of the substrate, with the cross-section of the second longitudinal grooves being greater than the cross-section of the first longitudinal grooves.

3. An integrated optical component according to claim 2, wherein the sections of said longitudinal grooves correspond to the dimensions of the stripped fibers and of the covered fibers that they are to receive, with the cross-section of the first longitudinal grooves being defined by the dimensions of each stripped fiber and with the cross-section of the second longitudinal grooves being defined by the dimensions of the covered fibers.

4. An integrated optical component according to claim 3, wherein said longitudinal grooves and said transverse grooves are machined grooves with their cross-sections defined by the machining tool used therefor.

5. A method of manufacturing an integrated optical component having a glass substrate with integrated optical waveguides and a central portion thereof, first longitudinal grooves substantially in axial alignment with the various individual waveguides and two end portions at opposite ends of the central portion to receive optical fibers to be connected to the waveguides and two first transverse grooves adjacent to the waveguides at respective ones of said central portion, defining on each end of the central portion an interface shoulder for connection therewith, two second transverse grooves parallel to said first transverse grooves and adjacent to said first longitudinal groove and respective ones of the two end portions, which longitudinal grooves open out therein, and a rib between the first and second transverse grooves at each end of the central portion, the height of the rib above the bottom of the first transverse grooves being substantially less than the height of the central portion thereabove for supporting the end of each optical fiber positioned against the adjacent interface shoulder at a proper vertical height and in exact axial alignment with respective ends of said integrated optical waveguides of said central portion of said substrate, said method comprising the following steps successively in a glass substrate having faces that are initially plane:

- in a first stage, forming said waveguides by integrated optical techniques in said central portion and longitudinally therebeyond on either side thereof, and forming marks in axial alignment with the individual waveguides and positioned substantially on the two ends of the substrate at opposite longitudinal ends of the central portion;
- in a second stage, machining first longitudinal grooves by using the terminal portions of the waveguides and said marks obtained in the first stage as guides for the lines followed by the first longitudinal grooves, each of which is formed on an end portion of one of the waveguides, on the corresponding mark, and between said waveguide and said mark;
- in a third stage, machining first and second transverse grooves thereby defining said ribs therebetween, eliminating the machining interfaces between the first longitudinal grooves and the waveguides; and
- in a fourth stage, machining said ribs to reduce them in vertical height.

6. A method according to claim 1, wherein said step of creating said waveguides comprises simultaneously forming said waveguides with the terminal portions thereof including the corresponding marks.

7. A method according to claim 5, further comprising the steps of machining second longitudinal grooves, each second longitudinal groove opening out to one of the ends of the substrate and to the facing end of the corresponding first longitudinal groove.

* * * * *